3,631,195
METHOD OF PRODUCING TETRASILA-
ADAMANTANES
Cecil L. Frey and Donald R. Weyenberg, Midland, and Jerome M. Klosowski, Bay City, Mich., assignors to Dow Corning Corporation, Midland, Mich.
No Drawing. Filed May 18, 1970, Ser. No. 38,496
Int. Cl. C07d 103/02
U.S. Cl. 260—448.2 E    6 Claims

ABSTRACT OF THE DISCLOSURE

Tetrasila-adamantane compounds are produced by aluminum halide catalyzed rearrangement of silmethylene compounds. The compounds are useful as mosquito repellents.

---

This invention relates to the preparation of 1,3,5,7-tetrasila-adamantanes. More particularly, the invention relates to the aluminum halide catalyzed rearrangement of silmethylene compounds to obtain tetrasila-adamantane compounds.

Tetrasila-admantane compounds can be represented by the structural formula

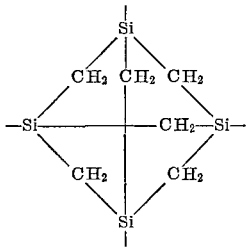

This cage structure, whose four bridgehead silicon valences are tetrahedrally arranged, forms a tetravalent nucleus which can be conveniently represented by the symbol "Ad." The methyl-substituted tetrasila-adamantane, $(CH_3)_4Ad$, has been produced by the pyrolysis of tetramethylsilane at 650° C.—see Fritz et al., "Carbosilanes," Advances in Inorganic and Radiochemistry, vol 7, page 349, Academic Press (1965). The chlorinated compound, $AdCl_4$, was obtained in very low yield from the high temperature (500° C.) reaction of tetrachlorosilane and trimethylchlorosilane in the presence of aluminum chloride as reported in JACS, 83, 3345 (1961). Neither of these processes is commercially feasible.

Accordingly, it is an object of the invention to provide an economic method of producing tetrasila-adamantanes.

The invention provides a method of synthesizing compounds of the formula $R_4Ad$, in which each R is independently selected from the group consisting of the methyl radical, the bromine atom, and the chlorine atom, the method comprising reacting silmethylene compounds selected from the group consisting of $\{(CH_3)_2SiCH_2\}_n$, where $n$ is an integer having a value of 2 or greater, $\{(CH_3)_2XSi\}_2CH_2$ where X is a chlorine or bromine atom, $\{(CH_3)_3Si\}_2CH_2$ and mixtures thereof in the presence of a catalyst selected from the group consisting of aluminum chloride, aluminum bromide and mixtures thereof.

Thus, the silmethylene reactants include $\{(CH_3)_2SiCH_2\}_2$
$\{(CH_3)_2SiCH_2\}_4$, $\{(CH_3)_2SiCH_2\}_{10-20}$, $\{(CH_3)_2SiCH_2\}_{50}$
$\{(CH_3)_2ClSi\}_2CH_2$, $[(CH_3)_2BrSi]_2CH_3$ and $\{(CH_3)_3Si\}_2CH_2$.
Mixtures of and $\{(CH_3)_3Si\}_2CH_2$. Mixtures of reactants can be utilized when desired. Mixtures of the higher polymeric silmethylenes are especially suitable as starting materials.

In contrast to prior art methods, the process of the invention is carried out at relatively mild temperatures. Although it is believed that the reaction will occur at room temperature, mild initial heating increases the rate of reaction greatly. It is most convenient to initiate the reaction by heating to the reflux temperature of the reactant or mixture of reactants. The reaction proceeds rapidly when the reactants are heated at about 100° C. at atmospheric temperature. Higher temperatures and pressures can be used but give no great advantage. The amount of catalyst can be varied from 10% to greater than 100% by weight based on the weight of silmethylene reactant. Although the reaction may occur, the reaction time appears to be excessively long when less than 10 weight percent catalyst is used. Within certain limits the amount of catalyst has an effect on the ratio of the various substituents in the mixed product. For example the use of 15 weight percent of aluminum chloride gives $(CH_3)_4Ad$ as the predominant product, while when 40 weight percent of aluminum chloride is used, the predominant product is $(CH_3)_3AdCl$.

The dimethylsilmethylene cyclic trimer,

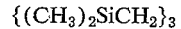

reacts readily and is the preferred starting material for use in the process of the invention, which proceeds according to the following equation:

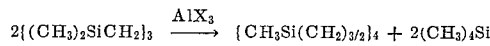

The tetrasila-adamantane product can be separated from the reaction mixture by distillation. When a mixed product is obtained, the separation of the various derivatives is accomplished by fractional crystallization or fractional sublimation.

The production of tetrasila-adamantanes by this reaction results in relatively non-volatile tars, which can be further reacted with the aluminum halide to yield additional quantities of the adamantane product. If desired the reaction can be carried out in a suitable solvent, such as benzene.

The tetrasila-adamantanes in which at least one R substituent is a methyl radical are useful as mosquito repellents when applied to human skin in small quantities. The tetrahalotetrasila-adamantanes can be reacted with tetramethylsilane in the presence of aluminum chloride to yield the useful methyl-substituted tetrasila-adamantanes. This ligand redistribution reaction can be carried out at atmospheric pressure and relatively low temperatures, for example 60° C. Exemplary of such a redistribution is the reaction shown below:

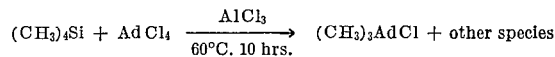

The following examples are to be considered ilustrative of the invention which is properly delineated in the claims.

EXAMPLE 1

Dimethylsilmethylene cyclic trimer (130 grams, 0.61 mole) was added to $AlBr_3$ (22.5 grams, 0.085 mole) in a one-liter, three-neck round bottom flask which was connected to a gas bag through a cold trap. Upon applying heat the temperature rose to approximately 100° C., then gradually decreased as the tetramethylsilane was formed. The condenser was allowed to warm and the tetramethylsilane was driven over into the cold trap. After approximately 2 hours, 85% of the theoretical amount of tetramethylsilane had been collected and the GLC analysis indicated that no starting material remained. The reaction mixture was then diluted with benzene and acetone was added to quench the catalyst. Washing with water removed most of the catalyst.

The organic layer was washed further with dilute hydrochloric acid, rinsed with water, dried over sodium sulfate, concentrated on a Rinco evaporator and distilled on a spinning band column. The volatile portion of the product mixture was sublimed to the head of the column after the solvent and volatiles had been removed. The $(CH_3)_4Ad$ was further purified by two more passes through the column.

The yield of mixed tetrasila-adamantane derivatives was approximately 27%. Of this, 45% was $(CH_3)_4Ad$ obtained at greater than 99% purity. The remaining product was a mixture of $(CH_3)_4Ad$, $(CH_3)_3AdBr$, $(CH_3)_2AdBr_2$.

Samples of each were isolated and characterized by mass spectroscopy, infrered and n.m.r.

EXAMPLE 2

A mixture of 0.0175 mole of $\{(CH_3)_2ClSi\}_2CH_2$ and 0.0075 mole of aluminum chloride (28 weight percent) was refluxed for 24 hours. Trimethylchlorosilane was formed as a by-product and removed from the reaction mixture. After 24 hours the reaction was terminated and the product, a mixture of $CH_3AdCl_3$ and $AdCl_4$, was identified by GLC and mass spectroscopy.

EXAMPLE 3

A mixture of $\{(CH_3)_3Si\}_2CH_2$ and 40 weight percent of aluminum chloride was refluxed for 20 hours, after which benzene was added as a solvent. The mixture was then refluxed for an additional 48 hours. The reaction was terminated and analysis of the reaction mixture indicated the presence of $(CH_3)_4Ad$ and $(CH_3)_3AdCl$. These products were identified by GLC and mass spectroscopy.

EXAMPLE 4

A mixture of 50 grams of $\{(CH_3)_2SiCH_2\}_2$ and 25 grams of aluminum chloride was refluxed at approximately 100° C. for 6 hours, after which the tetramethylsilane byproduct was removed. Benzene was then added and the solution of reaction mixture was refluxed for 15 hours. The reaction was terminated and the product was isolated by the sublimation method described in Example 1. Both $(CH_3)Ad$ and $(CH_3)_3AdCl$ were recovered, each species being characterized by GLC and mass spectroscopy.

EXAMPLE 5

A polymer of $\{(CH_3)_2SiCH_2\}_{4-50}$ was mixed with a small amount of aluminum bromide and heated to 195° C. Incremental amounts of the catalyst, totaling 5.7 grams, were added over a period of 15 days and reaction of the materials was evidenced by a decrease to 165° C. in the reflux temperature. An additional 10 grams of aluminum bromide and 7 milliliters of benzene were added. The reaction was deemed complete three hours after this addition, the reflux temperature having dropped to 110° C. The products, $(CH_3)_4Ad$ and $(CH_3)_3AdBr$, were characterized by GLC and mass spectroscopy.

EXAMPLE 6

The compounds produced by the method of the invention were determined to be mosquito repellents by means of the following test: 2" x 2" of shaved areas of skin on the tester's forearms and backs of hands were exposed for a given period of time to approximately 500 mosquitoes of the species Aëdes aegypti in a 12" x 12" x 12" cage. The mosquitoes had been denied warm blood for 3 days. The mosquitoes were excited and put to flight before the hand or arm was put into the cage. The arm or hand was masked with polyethylene sheet material except for the test area. As a control, the untreated skin was exposed to the mosquitoes and the number of landings and bites was recorded. The $R_4Ad$ compositions were then applied to the control area and it was again exposed to the mosquitoes for at least a comparable period of time, the number of landings and bits being recorded. No test area was used for more than one repellant. Exemplary data obtained by this procedure is given below:

| Compound | Amount applied to 2" x 2" area (grams) | Time exposed | Landing | Bites |
|---|---|---|---|---|
| Control—none | | 1 min. 40 sec | 54 | 40 |
| 1 — 50% $(CH_3)_4Ad$ / 30% $(CH_3)_3AdCl_3$ / 20% $(CH_3)_3AdCH_2Si(CH_3)_5$ | 0.09 | 2 min | 24 | 3 |
| Control—none | | 30 sec | 11 | 11 |
| 2 — 60% $AdCl_4$ / 40% $CH_3AdCl_3$ | <0.03 | 30 sec | 8 | 3 |

These test results demonstrate the utility of the $R_4Ad$ and compounds as mosquito repellents.

Reasonable modification and variation are within the scope of the invention which sets forth novel methods of preparing tetrasila-adamantane compounds.

That which is claimed is:

1. A method of producing tetrasila-adamantane compounds of the formula

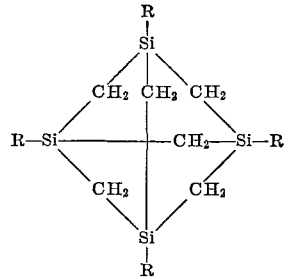

in which each R is independently selected from the group consisting of the methyl radical, the chlorine atom and the bromine atom; said method comprising reacting silmethylene compounds selected from the group consisting of $\{(CH_3)_2SiCH_2\}_n$ in which $n$ is an integer having a value of 2 or greater $(CH_3)_2BrSi)_2CH_2$. $\{(CH_3)_2ClSi\}_2CH_2$, $\{(CH_3)_3Si\}_2$ and mixtures thereof in the presence of at least 10 weight percent, based on the weight of silmethylene compound, of a catalyst selected from the group consisting of aluminum chloride, aluminum bromide and mixtures thereof.

2. The method of claim 1 wherein said silmethylene compound is $\{(CH_3)_2SiCH_2\}_2$.

3. The method of claim 1 wherein said silmethylene compound is $\{(CH_3)_2SiCH_2\}_3$.

4. The method of claim 1 wherein said silmethylene compound is $\{(CH_3)_2ClSi\}_2CH_2$.

5. The method of claim 1 wherein said silmethylene compound is $\{(CH_3)_3Si\}_2CH_2$.

6. The method of claim 1 wherein said reaction is initiated by heating the reactants to reflux temperature.

References Cited

UNITED STATES PATENTS 3,342,880   9/1967   Reinhardt _____ 260—448.20 X

TOBIAS E. LEVOW, Primary Examiner

P. F. SHAVER, Assistant Examiner

U.S. Cl. X.R.

260—448.2 D; 424—184, DIGEST 10